Patented Nov. 4, 1930

1,780,633

UNITED STATES PATENT OFFICE

WILHELM PUNGS, OF LUDWIGSHAFEN-ON-THE-RHINE, AND MICHAEL JAHRSTORFER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF WAX COMPOSITIONS

No Drawing. Application filed January 5, 1929, Serial No. 330,612, and in Germany January 24, 1928.

The present invention relates to improvements in the production of wax compositions.

In the application for Letters Patent No. 247,454, filed January 17, 1928, one of the present inventors together with another has described a process for the production of Montan wax products, in which a portion of the organic acids present in bleached Montan wax is esterified, for example by treatment with alcohols or alcohol mixtures, and the remainder is wholly or partially converted into salts, for example by the action of an alkali or an alkali earth hydroxide or mixtures of salts. These Montan wax products possess excellent binding properties for solvents and diluents such as oil of turpentine and the like, and are therefore excellently adapted for the production of shoe creams, floor polishes, cosmetic preparations, coloring masses for typewriter ribbons or stamp pads, carbon duplicating papers, polishes for colored or uncolored paper and the like. In comparison with carnauba wax which has hitherto been employed in the manufacture of these articles, the said Montan wax products have considerable advantages, such as greater hardness, lighter color, greater capacity for fixing oils, freedom from undesirable impurities, residues and the like. When these Montan wax products are used in the preparation of creams, pastes, emulsions and the like, in which scaps and oils form ingredients larger or smaller amounts of gritty deposits are often observed which do not occur when carnauba wax is used. In some cases, where aqueous emulsions are concerned, as in the case of polish stains, this drawback can be removed by passing the emulsion containing such deposits through a mill or fine sieve, preferably while still warm. This method, however, is not applicable in all cases.

We have now found that wax compositions free from the said drawbacks are obtained by melting a partially esterified and partly saponified product obtained according to the said application and hereinafter referred to as composition wax with a wax prepared by extensively esterifying with an alcohol such as glycol a bleached Montan wax, obtained, for example, according to the processes described in the application No. 254,604, filed February 15, 1928, by treating Montan wax in a sulphuric acid solution of 30 to 60 per cent strength with only such amounts of chromic acid as are sufficient for bleaching the Montan wax at temperatures between about 100° and 125° C. until the chromic acid is used up, or according to the Patent No. 1,737,975, by treating Montan wax with a substantially larger amount of oxidizing agents, for example with from 175 to 200 per cent of chromic acid reckoned on the amount of deresinified wax, than is needed for completely bleaching the wax.

The said composition waxes contain about from 25 to 30 per cent by weight of salts and this content is lowered by working in accordance with the present invention to a content of less than 25 per cent. In most cases, the best effects can be attained in the application of the new products when they contain about from 15 to 20 per cent of salt, the content of the esters being increased in comparison to that of the initial composition wax.

By varying the relative proportions of the two components of the mixture, there may be imparted to the product the properties desired in connection with the various purposes for which it is intended to be used. In fact, it is possible, in this way, to arrive at products which, in many instances, may partly or entirely replace the other expensive waxes, such as beeswax, Japan wax and the like, such as are used, for example, in the preparation of saponified and mixed shoe creams.

The products obtainable in this way are excellently suitable, for example, for the manufacture of so-called mixed shoe creams of varying consistency, prepared by saponifying the mass with aqueous alkali with the addition of oil of turpentine and the like. Such shoe creams are completely homogeneous, contain the oil of turpentine in a satisfactory fixed condition, and are quite equal to the creams made with carnauba wax.

The following examples will further illustrate the nature of the said invention which, however, is not limited thereto. The parts are by weight.

Example 1

4 parts of composition wax, prepared according to the said application Ser. No. 247,454, by mixing 100 parts of a highly bleached Montan wax with about 8 parts of glycol, maintaining the mixture for several hours at 140° C., then stirring 2.3 parts of calcium oxide into the mass and keeping it at about the said temperature, while stirring, until the melt has clarified, are melted with 2 parts of bleached Montan wax which has been esterified with glycol to an acid value of about 20. The resulting product is excellently suitable, for example, for the preparation of a mixed shoe cream. For this purpose, 6.5 parts of paraffin wax, 3 parts of beeswax and 1.5 parts of colophony are added to the melted product. When the whole is melted, 50 parts of boiling water, containing 2 parts of potassium carbonate in solution, are stirred in, followed by 15 parts of oil of turpentine. Stirring is continued until the paste has acquired the desired consistency, and it is then poured.

Instead of the 3 parts of beeswax, 2 additional parts of highly esterified bleached Montan wax may be taken.

Example 2

2.5 parts of composition wax and 1.5 parts of bleached Montan wax which has been extensively esterified with a mixture of 3 parts of glycerol and 1 part of benzyl alcohol, are melted together. The product is suitable for the production of a liquid shoe cream, for which purpose there are added to the melted product 12 parts of beeswax and 12 parts of Japan wax, 70 parts of boiling water containing 1 part of curd soap and 1 part of borax in solution, are then stirred in, followed by the addition of 40 parts by volume of oil of turpentine. After a short stirring, the mass is allowed to cool.

The said initial materials may be replaced by 2.5 parts of composition wax, 10 parts of bleached Montan wax, highly esterified with glycol, 5 parts of beeswax and 5 parts of Japan wax, melted together and mixed, by stirring, with the aforesaid amount of boiling water with curd soap and borax and oil of turpentine.

Example 3

66 parts of a composition wax containing about 12 parts of lead salt and 6 parts of potassium salt and 34 parts of a Montan wax, highly bleached, for example, in accordance with the process described in the aforesaid Patent No. 1,737,975 and esterified with a mixture consisting of 3 parts of diethyleneglycol and 2.5 parts of propylene glycol are melted together. The product obtained is then melted while intensely stirring with 25 parts of grain soap at about 120 to 130° C. whereupon, while intensely stirring, 900 parts of boiling water are run in, rather slowly at the beginning; the whole mass is then brought to boiling and stirred until it is cooled down. The product is a homogeneous emulsion which is excellently suitable for the production of polished papers.

What we claim is:

1. A composition of matter comprising a bleached Montan wax comprising esters and salts of the acids contained in the said wax, the salts being present in an amount of less than 25 per cent by weight of the said wax.

2. A composition of matter comprising a bleached Montan wax comprising esters with polyhydric alcohols and salts of the acids contained in the said wax, the salts being present in an amount of less than 25 per cent by weight of the said wax.

3. A composition of matter comprising a bleached Montan wax comprising esters and alkaline earth metal salts of the acids contained in the said wax, the salts being present in an amount of less than 25 per cent by weight of the said wax.

4. A composition of matter comprising a bleached Montan wax comprising esters with polyhydric alcohols and alkaline earth metal salts of the acids contained in the said wax, the salts being present in an amount of less than 25 per cent by weight of the said wax.

5. A composition of matter comprising a bleached Montan wax comprising esters and salts of the acids contained in the said wax, the salts being present in an amount of from 15 to 20 per cent by weight of the said wax.

6. A composition of matter comprising a bleached Montan wax comprising esters with polyhydric alcohols and salts of the acids contained in the said wax, the salts being present in an amount of from 15 to 20 per cent by weight of the said wax.

7. A composition of matter comprising a bleached Montan wax comprising esters and alkaline earth metal salts of the acids contained in the said wax, the salts being present in an amount of from 15 to 20 per cent by weight of the said wax.

8. A composition of matter comprising a bleached Montan wax comprising esters with polyhydric alcohols and alkaline earth metal salts of the acids contained in the said wax, the salts being present in an amount of from 15 to 20 per cent by weight of the said wax.

9. A composition of matter comprising a bleached Montan wax comprising glycol esters and calcium salts of the acids contained in the said wax, the salts being present in an amount of less than 25 per cent by weight of the said wax.

10. A composition of matter comprising a bleached Montan wax comprising glycol esters and calcium salts of the acids contained in the said wax, the salts being present in an amount of from 15 to 20 per cent by weight of the said wax.

11. A composition of matter comprising a bleached Montan wax comprising glycol esters and calcium salts of the acids contained in the said wax, the salts being present in an amount of less than 25 per cent by weight of the said wax, and a natural wax.

In testimony whereof we have hereunto set our hands.

WILHELM PUNGS.
MICHAEL JAHRSTORFER.